United States Patent
Kim et al.

(10) Patent No.: US 8,421,775 B2
(45) Date of Patent: Apr. 16, 2013

(54) METHOD AND APPARATUS FOR DETECTING TOUCH POINT

(75) Inventors: Jae-Shin Kim, Yongin (KR); Ja-Seung Ku, Yongin (KR); Min-Jeung Lee, Yongin (KR); Hee-Chul Hwang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 716 days.

(21) Appl. No.: 12/566,512

(22) Filed: Sep. 24, 2009

(65) Prior Publication Data

US 2010/0097349 A1    Apr. 22, 2010

(30) Foreign Application Priority Data

Oct. 17, 2008    (KR) .................. 10-2008-0102107

(51) Int. Cl.
*G06F 3/042*    (2006.01)

(52) U.S. Cl.
USPC ........................ 345/175; 382/103; 382/181

(58) Field of Classification Search .................. None
See application file for complete search history.

(56) References Cited

U.S. PATENT DOCUMENTS

| | | | |
|---|---|---|---|
| 2006/0170658 A1 | 8/2006 | Nakamura et al. | |
| 2007/0070007 A1 | 3/2007 | Imai et al. | |
| 2008/0226192 A1 | 9/2008 | Silverstein et al. | |
| 2008/0252618 A1* | 10/2008 | Chung et al. | 345/175 |
| 2008/0259053 A1* | 10/2008 | Newton | 345/175 |
| 2008/0273755 A1* | 11/2008 | Hildreth | 382/103 |
| 2010/0134444 A1 | 6/2010 | Yahata | |
| 2011/0037725 A1* | 2/2011 | Pryor | 345/174 |

FOREIGN PATENT DOCUMENTS

| | | |
|---|---|---|
| JP | 2007-183706 | 7/2007 |
| JP | 2008-83677 | 4/2008 |
| JP | 2008-250774 | 10/2008 |
| JP | 2008-250951 | 10/2008 |

OTHER PUBLICATIONS

European Search Report dated May 11, 2011, for corresponding European Patent application 09252432.1.
European Office action dated Apr. 12, 2012, for corresponding European Patent application 09252432.1, (5 pages).

* cited by examiner

*Primary Examiner* — Andrew L Sniezek
(74) *Attorney, Agent, or Firm* — Christie, Parker & Hale, LLP

(57) ABSTRACT

A method of detecting a touch point includes detecting an edge image of a finger image from an input image, generating a touch point image utilizing the detected edge image, and calculating coordinates of the touch point from the touch point image. The touch point image may be generated by setting a center at a position separated by a set distance in a gradient direction with respect to a position where the edge image is detected, and generating the touch point image by summing up gradient magnitude values with respect to a set area based on the set center. The coordinates of multiple touch points may be calculated by updating coordinates of the multiple touch points according to the gradient magnitude values accumulatively summed up in the multiple touch points based on a comparison between the coordinates of the multiple touch points and the set distance.

26 Claims, 7 Drawing Sheets

METHOD AND APPARATUS FOR DETECTING TOUCH POINT

CROSS-REFERENCE TO RELATED PATENT APPLICATION

This application claims priority to and the benefit of Korean Patent Application No. 10-2008-0102107, filed on Oct. 17, 2008, in the Korean Intellectual Property Office, the disclosure of which is incorporated herein in its entirety by reference.

BACKGROUND OF THE INVENTION

1. Field of the Invention

The present invention relates to a method and apparatus for detecting a touch point of an object.

2. Description of the Related Art

There are a variety of methods to deliver or obtain information by directly touching an information medium. Touch panel displays are a known useful technology and have been used to deliver or obtain such information. For example, touch screen panels incorporating LCD technology have been developed. The touch screen panel incorporating LCD technology may also be applied not only to the LCD field but also to other suitable display fields. In particular, this technology may be applied to organic light emitting diodes (OLEDs) that are regarded as a next generation display technology.

In an optical sensor type touch panel display device, an optical sensor is arranged in each pixel so that input of information on a screen utilizing light is possible. In the optical sensor type touch panel display device, for example, a photodiode is used as the optical sensor and a capacitor is connected to the photodiode of each pixel. Data of an image is generated by changing the amount of charges of the capacitor according to a change in the amount of light received by the photodiode, and detecting voltages at the opposite ends of the capacitor. A display device having a function as a touch panel or a digitizer has been suggested as a possible application of the optical sensor type touch panel display device. The touch panel function enables input of information by detecting the shadow of an object, for example, a finger, projected onto a screen. Although the input information is recognized through a variety of image recognition algorithms, such image recognition algorithm are complex, and the large amount of calculations needed to operate such complex image recognition algorithms may impose a heavy burden on hardware.

SUMMARY OF THE INVENTION

An aspect of an embodiment of the present invention is directed toward a method and apparatus for detecting a touch point by analyzing an image obtained by an optical sensor in a display device having a function of inputting information to a screen utilizing light.

Another aspect of an embodiment of the present invention, is directed toward a method and apparatus for detecting multi-touch points.

In another embodiment of the present invention, a display device utilizing the method and apparatus for detecting a touch point is provided.

According to an embodiment of the present invention, there is provided a method of detecting a touch point, which includes detecting an edge image of a finger image from an input image, generating a touch point image utilizing the detected edge image, and calculating coordinates of the touch point from the touch point image.

In the generating of the touch point image utilizing the detected edge image, the touch point image may be generated utilizing a gradient direction and gradient magnitude values obtained from the detected edge image.

In the generating of the touch point image using the detected edge image, the touch point image may be generated by accumulatively summing up the gradient magnitude values with respect to a position separated by a set distance in the gradient direction of the detected edge image.

The generating of the touch point image utilizing the detected edge image may include setting a center at a position separated by a set distance in the gradient direction with respect to a position where the edge image is detected, and generating the touch point image by summing up the gradient magnitude values with respect to a set area based on the set center.

In the calculating of the coordinates of the touch point from the touch point image, the coordinates of a pixel at a maximum value of the summed gradient magnitude values in the touch point image may be determined as the coordinates of the touch point.

The set distance may be a radius of a finger.

The set area may be determined according to the size of a tip portion of a finger.

In the calculating of the coordinates of the touch point from the touch point image, coordinates of at least two touch points may be calculated.

In the calculating of the coordinates of the touch point from the touch point image, the coordinates of the at least two touch points may be calculated by updating the coordinates of the at least two touch points according to the gradient magnitude values accumulatively summed up in the at least two touch points based on a comparison between the coordinates of the at least two touch points and the set distance.

The calculating of the coordinates of the touch point from the touch point image may include initializing coordinates of initial touch points and gradient magnitude values associated with the coordinates of the initial touch points, determining whether a gradient magnitude value of a pixel is greater than or equal to the gradient magnitude values associated with the coordinates of the initial touch points, for each of the initial touch points wherein the gradient magnitude value of the pixel is greater than the gradient magnitude value associated with the coordinates of the initial touch points, calculating a distance between the coordinates of the pixel and the initialized coordinates of each of the initial touch points, comparing the calculated distance and the set distance for each of the initial touch points and updating the coordinates of the initial touch points according to a result of the comparison, and determining the updated coordinates of the initial touch points as coordinates of the at least two touch points according to the result of the comparison.

In the updating of the coordinates of the at least two touch points, whether the calculated distances are less than or equal to the set distance may be determined.

The set distance may be a radius of a finger.

The calculating operation and the updating operation may be performed for a plurality of pixels.

In the detecting of the edge image of the finger image from the input image, the edge image of the finger image may be detected from the input image utilizing a Sobel filter.

According to another embodiment of the present invention, there is provided a method for detecting a touch point, which include detecting an edge image of an image of a finger contacting a touch panel, setting a center at a position separated by a set distance in a gradient direction of the edge image with respect to a position where the edge image is detected, generating a touch point image by accumulatively summing up gradient values of the edge image with respect to a set area based on the set center, and calculating coordinates of the touch point from the touch point image.

According to another embodiment of the present invention, there is provided a computer readable recording medium having recorded thereon a program for executing a method for detecting a touch point which includes detecting an edge image of a finger image from an input image, generating a touch point image using the detected edge image, and calculating a coordinate of the touch point from the touch point image.

According to another aspect of the present invention, there is provided an touch point detector, wherein the detector includes an edge detector configured to detect an edge image of a finger image from an input image, a touch point image generator configured to generate a touch point image utilizing the detected edge image, and a coordinate calculator configured to calculate coordinates of the touch point from the touch point image.

The touch point image generator may be configured to generate the touch point image utilizing a gradient direction and gradient magnitude values of the detected edge image.

The touch point image generator may generate the touch point image by accumulatively summing up the gradient magnitude values with respect to a position separated a predetermined distance in the gradient direction of the detected edge image.

The touch point image generator may include a center setting unit configured to set a center at a position separated by a set distance in the gradient direction with respect to a position where the edge image is detected, and a gradient summing unit configured to generate the touch point image by summing up the gradient magnitude values with respect to a set area based on the set center.

The coordinate calculator may determine coordinates of a pixel at a maximum value of the summed gradient magnitude values in the touch point image, as the coordinates of the touch point.

The coordinate calculator may be configured to calculate coordinates of at least two touch points.

The coordinate calculator may include an initialization unit configured to initialize coordinates of the initial touch points and gradient magnitude values associated with the coordinates of the initial touch points, a distance calculator configured to calculate a distance between coordinates of a pixel and coordinates of each of the touch points, an update determination unit configured to compare the calculated distance and the set distance for each of the initial touch points and to update the coordinates of the initial touch points according to a result of the comparison, and a coordinate determination unit configured to determine the updated coordinates of the initial touch points as the coordinates of the at least two touch points.

The update determination unit may determine whether the calculated distance is less than or equal to the set distance.

The distance calculation unit and the update determination unit may perform the calculation of the distances and the update of the coordinates for a plurality of pixels.

According to another embodiment of the present invention, there is provided a display device having at least one optical sensor detecting touch by a finger, which includes a sensor signal reader configured to read out a signal detected by the optical sensor, and a touch point detector configured to generate an image of shadow of the finger from the signal detected by the optical sensor, detect an edge image from the generated image, generate a touch point image utilizing the detected edge image, and calculate coordinates of a touch point from the touch point image.

The touch point detector may detect multiple touch points.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Figure 1:
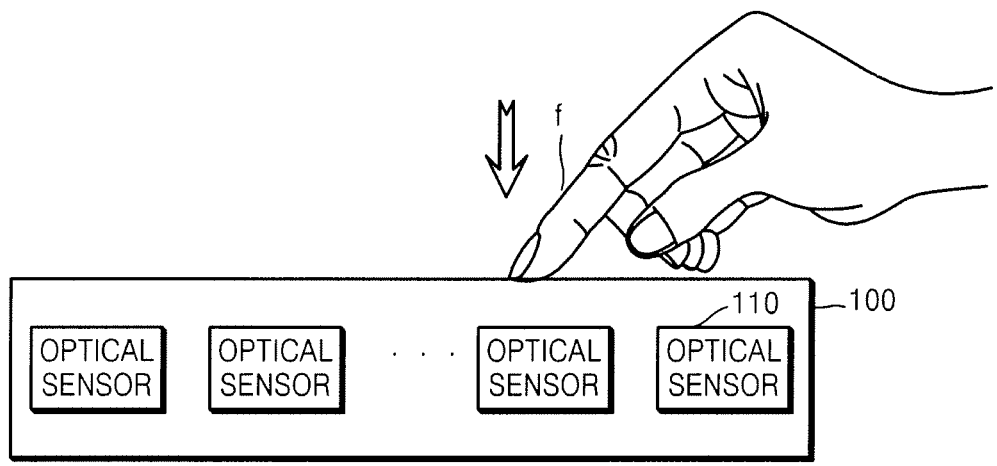
FIG. 1 schematically illustrates a display device having a function of inputting information on a screen utilizing light, according to an embodiment of the present invention.

FIG. 1 schematically illustrates a display device 100 having a function of inputting information on a screen utilizing light, according to an embodiment of the present invention. Referring to FIG. 1, the display device 100 includes a plurality of optical sensors 110. The display device 100 may also include a plurality of TFTs and a variety of display elements. For example, the display device 100 may include a plurality of electrodes constituting the TFTs, a plurality of layers such as semiconductor layers and insulation layers, and a plurality of organic light emitting devices. The organic light emitting device includes a pixel electrode, an opposite electrode opposite to the pixel electrode, and an intermediate layer which includes a light emitting layer interposed between the pixel electrode (e.g., an anode electrode) and the opposite electrode (e.g., a cathode electrode). In an embodiment, the display device 100 detects a shadow of a finger F and light reflected by the finger F due to external light illuminating the finger F. Also, although an organic light emitting device is specified above, other flat display devices, for example, LCDs or PDPs, may be used instead.

When an object such as the finger F comes into contact with the display device 100, the optical sensor 110 detects an optical signal generated by the finger F due to an external or internal light source. For example, when the optical sensor 110 detects light that is brighter than a set (or predetermined) value, a signal processing unit outputs a high level signal. When the optical sensor 110 detects light that is darker than a set (or predetermined) value, the signal processing unit outputs a low level signal. The optical sensor 110 may be embodied by a PINtype optical diode.

Figure 2:
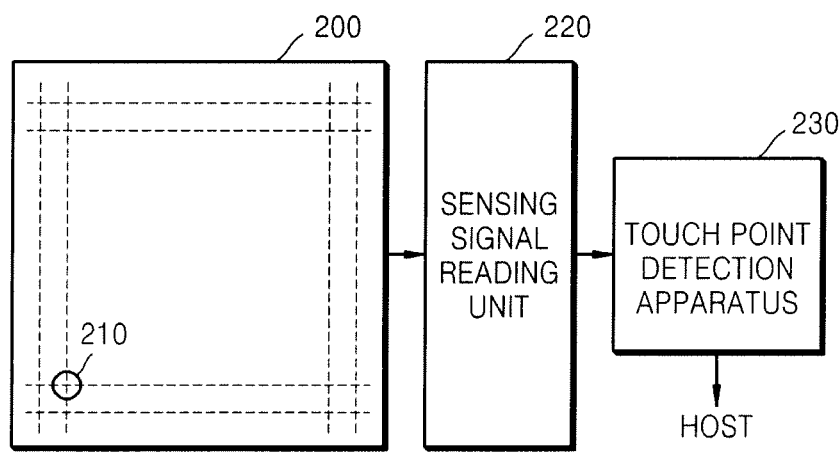
FIG. 2 is a schematic block diagram of a display device including a touch point detector according to an embodiment of the present invention.

FIG. 2 is a schematic block diagram of a display device 200 including a touch point detector 230 (e.g., touch point detection apparatus 230) according to an embodiment of the present invention. Referring to FIG. 2, the display device 200 includes an optical sensor 210. The touch point detector 230 is connected to the display device 200 via a sensing signal reading unit 220.

The display device 200 includes a plurality of pixels formed of red (R), green (G), and blue (B) that are arranged, with the optical sensors 210, at positions where a plurality of signal lines and a plurality of scanning lines cross. The display device 200 performs a display function to display an image based on an image signal transmitted by an external host.

The sensor signal reading unit 220 reads the signal detected by the optical sensor 210 of the display device 200 and outputs the detected signal to the touch point detector 230. The touch point detector 230 detects a touch point by analyzing the signal detected by the optical sensor 210. In an embodiment, the touch point detector 230 generates an image of a shadow of a finger from a signal detected by the optical sensor 210, detects an edge image from the finger shadow image (an input image), generates a touch point image (hereinafter, referred to as the TP image) from the detected edge image, and calculates coordinates of a touch point from the generated TP image. The structure and function of the touch point detector 230 will be described in more detail later.

Figure 3:
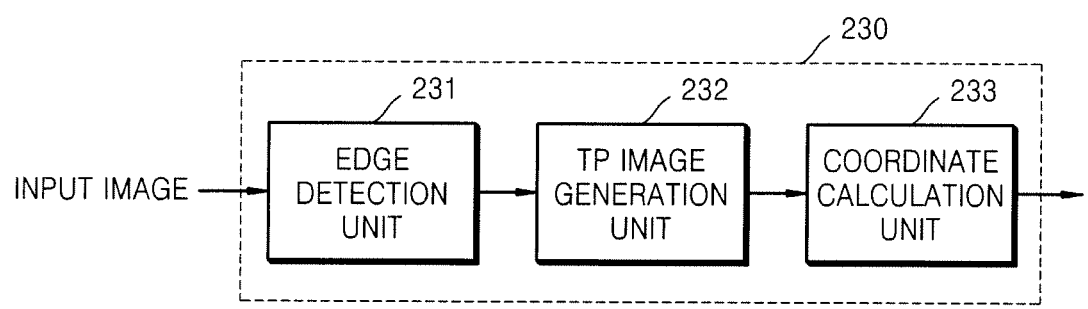
FIG. 3 is a schematic block diagram of the touch point detector of FIG. 2 according to an embodiment of the present invention.

FIG. 3 is a schematic block diagram of the touch point detector 230 of FIG. 2. Referring to FIG. 3, the touch point detector 230 includes an edge detector 231 (e.g., edge detection unit 231), a TP image generation unit 232 (e.g., touch point image generator 232), and a coordinate calculator 233 (e.g., coordinate calculation unit 233). Although it is not illustrated, the touch point detector 230 may further include a signal processing unit including a line memory, a gradation circuit, or a binarization circuit, to generate a finger shadow image from the signal detected by the optical sensor 210.

The edge detector 231 detects only an edge component from an input image and outputs an edge image. The edge detection may be performed utilizing any suitable edge detection method, for example, a Laplacian filter, a Roberts filter, a Sobel filter, or a Prewitt filter. In an exemplary embodiment, the edge component is detected utilizing a Sobel filter, which is described below in further detail.

First, the convolution of an input image A is performed by applying a Sobel operator as in Equation 1.

$$G_x = \begin{bmatrix} +1 & 0 & -1 \\ +2 & 0 & -2 \\ +1 & 0 & -1 \end{bmatrix} \times A \quad \text{[Equation 1]}$$

and $$G_y = \begin{bmatrix} +1 & +2 & +1 \\ 0 & 0 & 0 \\ -1 & -2 & -1 \end{bmatrix} \times A$$

In Equation 1, $G_x$ and $G_y$ denote the edge components in the directions x and y, respectively. With respect to the $G_x$ and $G_y$ calculated utilizing Equation 1, the amounts and directions of the edge components are calculated utilizing Equations 2 and 3.

$$G = \sqrt{G_x^2 + G_y^2} \quad \text{[Equation 2]}$$

$$\Theta = \arctan\left(\frac{G_y}{G_x}\right) \quad \text{[Equation 3]}$$

Figure 4A:
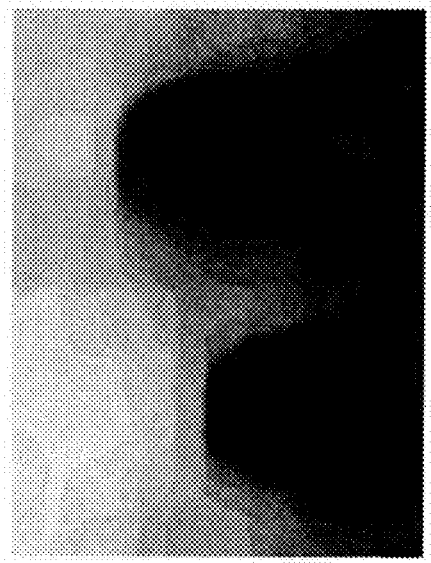
FIG. 4A is an input image to be input to the edge detector of FIG. 2 according to an embodiment of the present invention.
Figure 4B:
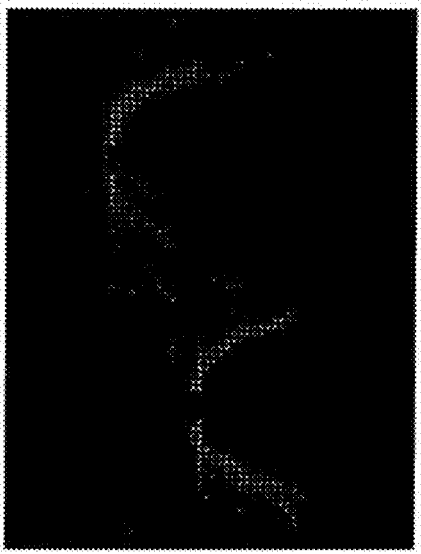
FIG. 4B is an edge image output by the edge detector of FIG. 2 according to an embodiment of the present invention.

Also, when the value of G calculated from Equation 2 is smaller than a set (or predetermined) critical value, the value of G is determined to be "0". The edge image may be obtained from the above calculation. FIG. 4A is an input image to be input to the edge detector of FIG. 2 according to an embodiment of the present invention. FIG. 4B is an edge image output by the edge detector of FIG. 2 according to an embodiment of the present invention. Specifically, the edge image output by the edge detector of FIG. 2 is calculated by applying a Sobel filter.

The TP image generator 232 generates a TP image by summing gradient magnitude values in a set (or predetermined) area with respect to a position separated a set (or predetermined) distance in a gradient direction Θ of the output edge image.

Figure 5A:
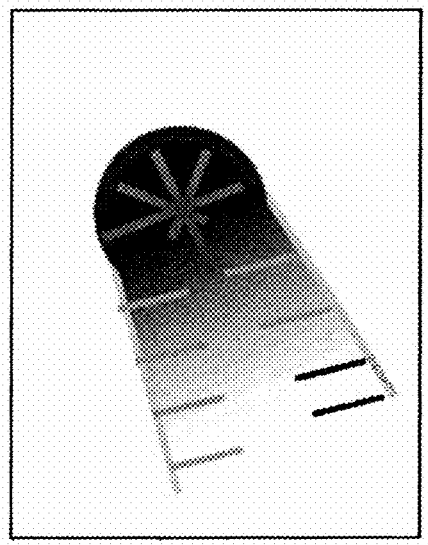
FIG. 5A is a diagram illustrating the generation of a touch point image utilizing the touch point image generator of FIG. 2 according to an embodiment of the present invention.
Figure 5B:
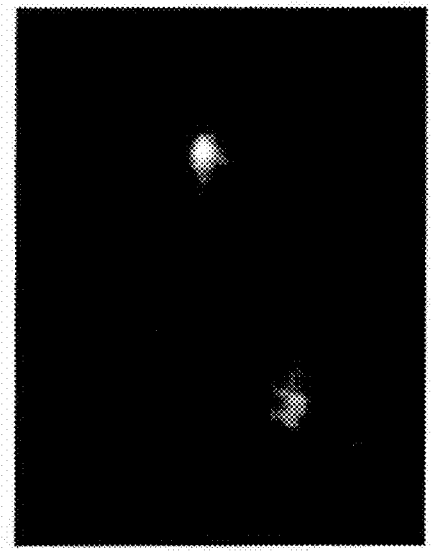
FIG. 5B is a touch point image generated by the touch point image generator of FIG. 2 according to an embodiment of the present invention.

FIG. 5A is a diagram illustrating the generation of a touch point image utilizing the touch point image generator of FIG. 2 according to an embodiment of the present invention. FIG. 5B is a touch point image generated by the TP image generator 232 of FIG. 2 according to an embodiment of the present invention. Referring to FIG. 5A, a center position is set at a position separated a set (or predetermined) distance in the gradient direction Θ. For example, the set (or predetermined) distance is a distance corresponding to a radius of a finger, from a position where an edge is detected. Since the tip of a finger normally has a circular shape, the center of the tip of a finger generally converges at a point. The gradient magnitude values are accumulatively summed up in a set (or predetermined) area, for example, 5×5 blocks, from the point. Accordingly, the gradient magnitude value is greater at the position around the tip of a finger. Although the above summing is performed in relation to the 5×5 blocks, the present invention is not limited to this size. For example, the size of the summing area may be determined according to the size of the tip of a finger, that is, an area where a finger actually touches the display device. FIG. 5B is a touch point image generated by the touch point image generator of FIG. 2 according to an embodiment of the present invention, and represents a final TP image according to an embodiment of the present invention.

Figure 6:
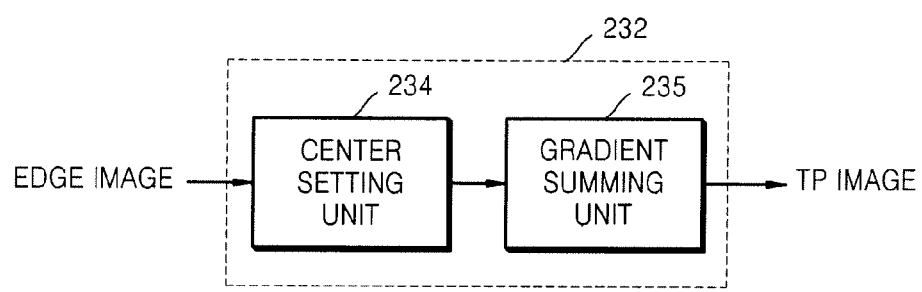
FIG. 6 is a schematic block diagram of the touch point image generator of FIG. 2 according to an embodiment of the present invention.

FIG. 6 is a schematic block diagram of the touch point image generator 232 of FIG. 2 according to an embodiment of the present invention. Referring to FIG. 6, the TP image generator 232 includes a center setting unit 234 and a gradient summing unit 235.

The center setting unit 234 sets a center at a position separated by a set (or predetermined) distance in a set (or predetermined) direction from the position where the edge is detected in the edge detector 231. The center setting unit 234 sets a center at a position separated by a set (or predetermined) distance in a direction from the position where the edge is detected and calculated by Equation 3, that is, in the gradient direction Θ. For example, the set distance is the radial distance of a finger. As described above, since the tip of a finger normally has a circular shape, the center of the tip of a finger converges at a point.

The gradient summing unit 235 accumulatively sums up the gradient magnitude values of a set (or predetermined) area with respect to the center set by the center setting unit 234. The set area may be set according to the size of the tip of a finger. Accordingly, the gradient magnitude value is greater at the tip of a finger as the size of the finger increases and thus the gradient magnitude value of the tip of a finger may increase as the size of the finger increases.

The coordinate calculator 233 calculates a coordinate of a touch point utilizing the TP image generated by the TP image generator 232. The coordinate calculator 233 determines the position of a pixel having the maximum gradient magnitude value in the TP image, as a touch point, and outputs the resulting gradient magnitude value to the host. Referring back to FIG. 5B, in the calculation of coordinates, the position of a pixel that is the brightest in the TP image is determined as a touch point.

Figure 7:
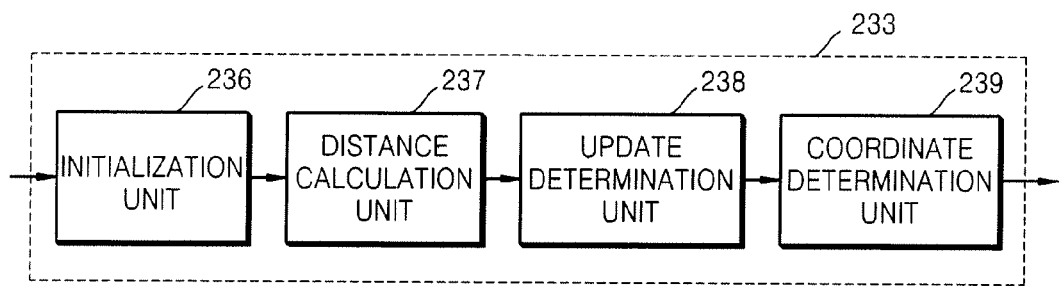
FIG. 7 is a schematic block diagram of a coordinate calculator according to an embodiment of the present invention.

FIG. 7 is a schematic block diagram of the coordinate calculator 233 according to an embodiment of the present invention. In the above-described exemplary embodiment, when a single touch point is to be determined, the position of the brightest pixel in the TP image may be determined as a touch point. However, when multiple touches, for example, three touch points, are to be determined, the method of determining a touch point based on the position of the brightest pixel may not be used. When three touch points are to be found in order of brightness, for example, it is impossible to accurately detect these touch points because the three brightest pixels may be found in one TP image. Thus, a method of detecting a touch point having a local maximum gradient magnitude value in a TP image to implement a multi-touch function is provided according to another exemplary embodiment of the present invention.

In an embodiment, three touch points $t_1$, $t_2$, and $t_3$ are determined for all pixel values P of a TP image. Assume that $TP(t_1) > TP(t_2) > TP(t_3)$, and that $TP(p)$ is a gradient magnitude value accumulated in a pixel p. Thus, $TP(t_1)$ is a gradient value accumulated in the touch point $(t_1)$. It is assumed that the $t_1$, $t_2$, and $t_3$ values are maintained to be over a set (or predetermined) distance d. The set distance d may be the size of a radius of a finger, for example, 0.5 cm.

Referring to FIG. 7, the coordinate calculator 233 (e.g., coordinate calculation unit 233) includes an initialization unit 236, a distance calculator 237 (e.g., distance calculation unit 237), an update determination unit 238, and a coordinate determinator 239 (e.g., coordinate determination unit 239). The initialization unit 236 initializes the initial $t_1$, $t_2$, and $t_3$ values and the $TP(p)$ value. For example, the initial $t_1$, $t_2$, and $t_3$ are all set to (−1, −1) based on a position of a pixel that does not exist. At this time, $TP(p)$ is initialized to "0".

The distance calculator 237 calculates the distance between the coordinate of a pixel (e.g., a present pixel) and each of $t_1$, $t_2$, and $t_3$. The update determination unit 238 updates the values of $t_1$, $t_2$, and $t_3$ according to whether the distance between the coordinate of the pixel and each of $t_1$, $t_2$, and $t_3$ is not less than or less than a set (or predetermined) distance d. The coordinate determination unit 238 determines the final updated coordinate values of $t_1$, $t_2$, and $t_3$ as resulting gradient magnitude values of multiple touch points.

Figure 8:
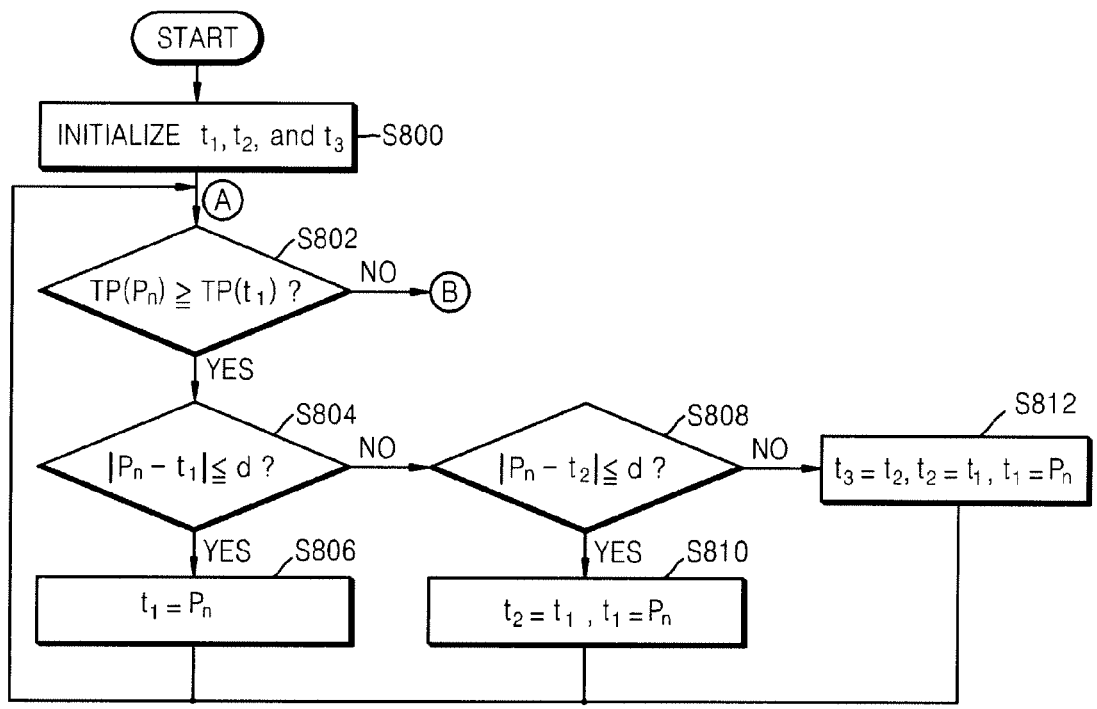
FIGS. 8-10 are flowcharts for explaining a coordinate calculation method for detecting multi-touch points according to another exemplary embodiment of the present invention.
Figure 9:
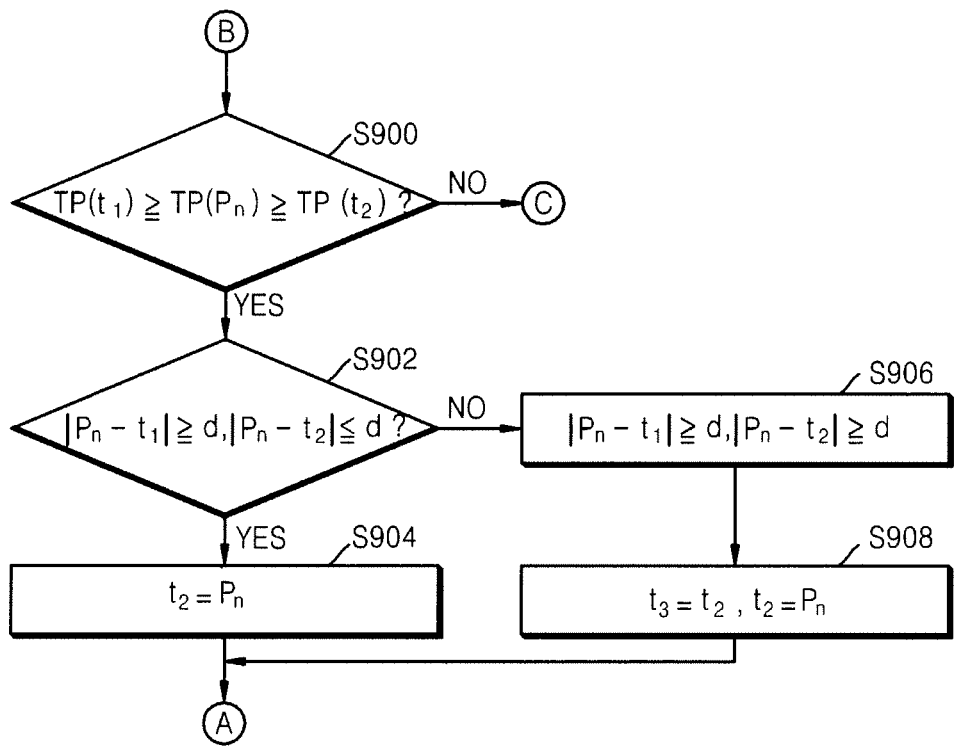
Figure 10:
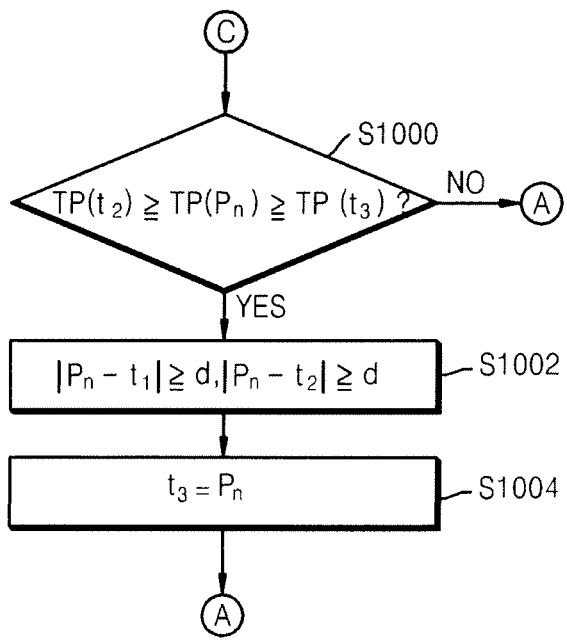

FIGS. 8-10 are flowcharts for explaining a coordinate calculation method of detecting multi-touch points according to an embodiment of the present invention. Referring to FIG. 8, in Operation 800, the $t_1$, $t_2$, and $t_3$ values and the $TP(p)$ value are initialized. For example, the coordinate values of $t_1$, $t_2$, and $t_3$ are all set to (−1, −1) and the $TP(p)$ value is initialized to "0".

In Operation 802, whether the $TP(P_n)$ value of a pixel $P_n$ is not less than $TP(t_1)$ is determined. When the $TP(P_n)$ value is not less than (e.g., greater than or equal to) $TP(t_1)$, Operation 804 is performed and whether the distance between $P_n$ and $t_1$ is not greater than (e.g., less than or equal to) d is determined. As a result of the determination in Operation 804, when the distance between $P_n$ and $t_1$ is not greater than (e.g., less than or equal to) d, $t_1$ is updated with $P_n$. Operation 802 is performed with respect to the next pixel.

In Operation 804, when the distance between $P_n$ and $t_1$ is not less than or equal to d, Operation 808 is performed and whether the distance between $P_n$ and $t_2$ is not greater than d is determined. As a result of the determination in Operation 808, when the distance between $P_n$ and $t_2$ is not greater than (e.g., less than or equal to) d, Operation 810 is performed so that $t_2$ is updated with $t_1$ and $t_1$ is updated with $P_n$. Operation 802 is performed with respect to the next pixel.

As a result of the determination in Operation 808, when the distance between $P_n$ and $t_2$ is not less than or equal to (e.g., greater than) d, Operation 812 is performed so that t3 is updated with $t_2$, $t_2$ is updated with $t_1$, and $t_1$ is updated with $P_n$. Operation 802 is performed with respect to the next pixel.

Referring to FIGS. 8 and 9, as a result of the determination in Operation 802, when $TP(P_n)$ is not greater than or equal to (e.g., less than) $TP(t_1)$, Operation 900 is performed and whether $TP(P_n)$ is not less than (e.g., greater than or equal to) $TP(t_2)$ is determined. As a result of the determination in Operation 900, when $TP(P_n)$ is not less than (e.g., greater than or equal to) $TP(t_2)$, Operation 902 is performed and whether the distance between $P_n$ and $t_1$ is not less than (e.g., greater than or equal to) d and the distance between $P_n$ and $t_2$ is not greater than (e.g., less than or equal to) d is determined. When the distance between $P_n$ and $t_1$ is not less than (e.g., greater than or equal to) d and the distance between $P_n$ and $t_2$ is not greater than (e.g., less than or equal to) d, Operation 904 is performed so that $t_2$ is updated with $P_n$. Operation 802 is performed with respect to the next pixel.

As a result of the determination in Operation 902, when the distance between $P_n$ and $t_1$ is not less than (e.g., greater than or equal to) d and the distance between $P_n$ and $t_2$ is not less than (e.g., greater than or equal to) d, Operation 908 is performed so that $t_3$ is updated with $t_2$ and $t_2$ is updated with $P_n$. Operation 802 is performed with respect to the next pixel.

Referring to FIGS. 8-10, as a result of the determination in Operation 900, when $TP(P_n)$ is not greater than or equal to (e.g., less than) $TP(t_2)$, Operation 1000 is performed and whether $TP(P_n)$ is not less than (e.g., greater than or equal to) $TP(t_3)$ is determined. As a result of the determination in Operation 1000, when $TP(P_n)$ is not less than (e.g., greater than or equal to) $TP(t_3)$, Operation 1002 is performed so that, when both of the distance between $P_n$ and $t_1$ and the distance between $P_n$ and $t_2$ are not less than (e.g., greater than or equal to) d, $t_3$ is updated with $P_n$. Operation 802 is performed with respect to the next pixel.

As described above, in the method of detecting a touch point according to the present invention, an edge image of a finger image is detected from an input image, a touch point image is generated from the edge image, and a touch coordinate is calculated from the touch point image. Therefore, a simple touch recognition algorithm may be implemented utilizing the characteristic of a finger shape. Also, multiple touch points may be accurately detected.

Although the determination of coordinates of multi-touch points, that is, touch points of three portions is described with reference to FIGS. 8-10, the present invention is not limited to the number of 3 and a greater or fewer (e.g., 2 touch points or 4 or more touch points) number of touch points may be determined in the same method described above.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for detecting a touch point, the method comprising:
    detecting an edge image of a finger image from an input image;
    generating a touch point image utilizing the detected edge image; and
    calculating coordinates of the touch point from the touch point image,
    wherein, in the generating of the touch point image utilizing the detected edge image, the touch point image is generated utilizing a gradient direction and gradient magnitude values obtained from the detected edge image,
    wherein, in the generating of the touch point image utilizing the detected edge image, the touch point image is generated by accumulatively summing up the gradient magnitude values with respect to a position separated by a set distance in the gradient direction of the detected edge image, and
    wherein the generating of the touch point image utilizing the detected edge image comprises:
        setting a center at a position separated by the set distance in the gradient direction with respect to a position where the edge image is detected; and
        generating the touch point image by summing up the gradient magnitude values with respect to a set area based on the set center.

2. The method of claim 1, wherein, in the calculating of the coordinates of the touch point from the touch point image, coordinates of a pixel at a maximum value of the summed gradient magnitude values in the touch point image are determined as the coordinates of the touch point.

3. The method of claim 1, wherein the set distance is a radius of a finger.

4. The method of claim 1, wherein the set area is determined according to the size of a tip portion of a finger.

5. The method of claim 1, wherein, in the calculating of the coordinates of the touch point from the touch point image, coordinates of at least two touch points are calculated.

6. The method of claim 5, wherein, in the calculating of the coordinates of the touch point from the touch point image, the coordinates of the at least two touch points are calculated by updating the coordinates of the at least two touch points according to the gradient magnitude values accumulatively summed up in the at least two touch points based on a comparison between the coordinates of the at least two touch points and the set distance.

7. The method of claim 5, wherein the calculating of the coordinates of the at least two touch points from the touch point image comprises:
    initializing coordinates of initial touch points and gradient magnitude values associated with the coordinates of the initial touch points;
    determining whether a gradient magnitude value of a pixel is greater than or equal to the gradient magnitude values associated with the coordinates of the initial touch points; and
    for each of the initial touch points wherein the gradient magnitude value of the pixel is greater than the gradient magnitude value associated with the coordinates of the initial touch points,
        calculating a distance between coordinates of the pixel and the initialized coordinates of each of the initial touch points;
        comparing the calculated distance and the set distance for each of the initial touch points and updating the coordinates of the initial touch points according to a result of the comparison; and
        determining the updated coordinates of the initial touch points as the coordinates of the at least two touch points according to the result of the comparison.

8. The method of claim 7, wherein, in the updating of the coordinates of the at least two touch points, whether the calculated distances are less than or equal to the set distances is determined.

9. The method of claim 8, wherein in the updating of the coordinates of the at least two touch points, the updated coordinates of the initial touch points are determined as the coordinates of the at least two touch points when the calculated distances are less than or equal to the set distance.

10. The method of claim 8, wherein the set distances are a radius of a finger.

11. The method of claim 7, wherein the calculating and the updating operations are performed for a plurality of pixels.

12. The method of claim 1, wherein, in the detecting of the edge image of the finger image from the input image, the edge image of the finger image is detected from the input image utilizing a Sobel filter.

13. A computer readable recording medium comprising a nonvolatile data storage device having recorded thereon a program for executing the method defined in claim 1 on a computer system, the method further comprising:
    reading the program by the computer system; and
    executing the method defined in claim 1 on the computer system.

14. A method for detecting a touch point, the method comprising:
    detecting an edge image of an image of a finger contacting a touch panel;
    setting a center at a position separated by a set distance in a gradient direction of the edge image with respect to a position where the edge image is detected;

generating a touch point image by accumulatively summing up gradient magnitude values of the edge image with respect to a set area based on the set center; and calculating coordinates of the touch point from the touch point image.

15. The method of claim 14, wherein, in the calculating of the coordinates of the touch point from the touch point image, coordinates of a pixel at a maximum value of the summed gradient magnitude values in the touch point image are determined as the coordinates of the touch point.

16. The method of claim 14, wherein, in the calculating of the coordinates of the touch point from the touch point image, coordinates of at least two touch points are calculated.

17. The method of claim 16, wherein, in the calculating of the coordinates of the touch point from the touch point image, the coordinates of the at least two touch points are calculated by updating the coordinates of the at least two touch points according to the gradient magnitude values accumulatively summed up in the at least two touch points based on a comparison between the coordinates of the at least two touch points and the set distance.

18. A touch point detector comprising:
an edge detector configured to detect an edge image of a finger image from an input image;
a touch point image generator configured to generate a touch point image utilizing the detected edge image; and
a coordinate calculator configured to calculate coordinates of the touch point from the touch point image,
wherein the touch point image generator is configured to generate the touch point image utilizing a gradient direction and gradient magnitude values of the detected edge image,
wherein the touch point image generator generates the touch point image by accumulatively summing up the gradient magnitude values with respect to a position separated by a set distance in the gradient direction of the detected edge image, and
wherein the touch point image generator comprises:
a center setting unit configured to set a center at a position separated by a set distance in the gradient direction with respect to a position where the edge image is detected; and
a gradient summing unit configured to generate the touch point image by summing up the gradient magnitude values with respect to a set area based on the set center.

19. The detector of claim 18, wherein the coordinate calculator determines coordinates of a pixel at a maximum value of the summed gradient magnitude values in the touch point image as the coordinates of the touch point.

20. The detector of claim 18, wherein the calculator is configured to calculate coordinates of at least two touch points.

21. The detector of claim 20, wherein the coordinate calculator comprises:
an initialization unit configured to initialize coordinates of initial touch points and gradient magnitude values associated with the coordinates of the initial touch points;
a distance calculator configured to calculate a distance between coordinates of a pixel and the initialized coordinates of each of the touch points;
an update determination unit configured to compare the calculated distance and the set distance for each of the initial touch points and to update the coordinates of the initial touch points according to a result of the comparison; and
a coordinate determination unit configured to determine the updated coordinates of the initial touch points as the coordinates of the at least two touch points.

22. The detector of claim 21, wherein the update determination unit determines whether the calculated distance is less than or equal to the set distance.

23. The detector of claim 22, wherein in the update determination unit, the updated coordinates of the initial touch points are determined as the coordinates of the at least two touch points when the calculated distances are less than or equal to the set distance.

24. The detector of claim 22, wherein the distance calculator and the update determination unit perform the calculation of the distances and the update of the coordinates for a plurality of pixels.

25. A display device having at least one optical sensor detecting touch by a finger, the display device comprising:
a sensor signal reader configured to read out a signal detected by the optical sensor; and
a touch point detector configured to
generate an image of shadow of the finger from the signal detected by the optical sensor,
detect an edge image from the generated image,
set a center at a position separated by a set distance in a gradient direction of the edge image with respect to a position where the edge image is detected,
generate a touch point image by accumulatively summing up gradient magnitude values of the edge image with respect to a set area based on the set center, and
calculate coordinates of a touch point from the touch point image.

26. The display device of claim 25, wherein the touch point detector detects multiple touch points.

* * * * *